United States Patent [19]

Ono et al.

[11] Patent Number: 4,568,599
[45] Date of Patent: * Feb. 4, 1986

[54] LAMINATED FILM AND MAGNETIC RECORDING MEDIUM MADE THEREWITH

[75] Inventors: Masaaki Ono, Omihachiman; Yasuki Miura, Otsu; Masahiko Motegi, Hikone; Kazuo Okabe, Shiga, all of Japan

[73] Assignee: Toray Industries, Inc., Tokyo, Japan

[*] Notice: The portion of the term of this patent subsequent to Oct. 29, 2002 has been disclaimed.

[21] Appl. No.: 473,448

[22] Filed: Mar. 9, 1983

[30] Foreign Application Priority Data

Mar. 10, 1982 [JP] Japan .................................. 57-36340
Mar. 11, 1982 [JP] Japan .................................. 57-38762

[51] Int. Cl.$^4$ .............................................. G11B 5/72
[52] U.S. Cl. ..................................... 428/141; 428/145; 428/147; 428/149; 428/152; 428/201; 428/447; 428/480; 428/483; 428/484; 428/694; 428/695; 428/900
[58] Field of Search ................ 428/141, 145, 147, 149, 428/152, 447, 480, 483, 484, 694, 695, 201; 528/275, 286

[56] References Cited

U.S. PATENT DOCUMENTS

| | | | |
|---|---|---|---|
| 3,656,996 | 4/1972 | Van Paesschen et al. | 428/484 X |
| 3,821,156 | 6/1974 | Farrar | 524/425 X |
| 3,993,846 | 11/1976 | Higuchi et al. | 428/695 X |
| 4,138,386 | 2/1979 | Motegi et al. | 524/432 X |
| 4,171,406 | 10/1979 | Yamaguchi et al. | 428/447 |
| 4,233,352 | 11/1980 | Ono et al. | 428/141 |
| 4,348,446 | 9/1982 | Mitsuishi et al. | 428/694 X |
| 4,388,360 | 6/1983 | Miyoshi et al. | 428/172 |
| 4,390,601 | 6/1983 | Ono et al. | 428/484 X |
| 4,394,420 | 7/1983 | Tamai et al. | 428/900 X |
| 4,461,797 | 7/1984 | Adachi et al. | 428/147 |
| 4,489,117 | 12/1984 | Ono et al. | 428/480 |

FOREIGN PATENT DOCUMENTS

| | | |
|---|---|---|
| 51733 | 5/1973 | Japan . |
| 75249 | 6/1973 | Japan . |
| 115663 | 12/1973 | Japan . |
| 2087302 | 5/1982 | United Kingdom . |

Primary Examiner—George F. Lesmes
Assistant Examiner—William M. Atkinson
Attorney, Agent, or Firm—Austin R. Miller

[57] ABSTRACT

A laminated film for a super-high density magnetic recording medium, which comprises (A) a layer composed of a thermoplastic resin and (B) a layer of a thermoplastic resin containing fine particles therein. In this laminated film, the outer surface of the layer (A) has a surface roughness of less than 0.005$\mu$ as expressed as the Ra value, and the outer surface of the layer (B) has a surface roughness of 0.005 to 0.040$\mu$ as expressed as the Ra value. The outer surface of the layer (B) has either (i) a plurality of depressions and a plurality of protrusions, which are formed thereon in a configuration such that at least one protrusion exists within each depression or at least one protrusion exists in the area where two or more depressions are contiguous to each other, or (ii) protrusions on a flat plane and a covering layer (C) composed of a lubricant, which is formed on the surface of the layer (B). This covering layer (C) may be formed on the surface having the above-mentioned depressions and protrusions. The covering layer (C) is a continuous film layer or a discontinuous film layer formed of worm-like nodules. When a ferromagnetic metal thin film is formed on the surface of the layer (A) by vacuum evaporation and a protective film layer is formed on this thin film, there is obtained a vacuum-deposited video tape excellent in running properties and electromagnetic transformation performance. In this vacuum-deposited video tape, the transfer of the surface configuration due to the coarseness of the running surface can be prevented.

23 Claims, 10 Drawing Figures

LAMINATED FILM AND MAGNETIC RECORDING MEDIUM MADE THEREWITH

BACKGROUND OF THE INVENTION (1) Field of the Invention

This invention relates to a laminated thermoplastic film. More particularly, it relates to a base film suitable for a super high density magnetic recording medium having very good running properties.

(2) Description of the Prior Art

The increase in the recording density in the magnetic recording media has led to a demand for increased surface smoothness in the thermoplastic resin film used for the recording media. On the other hand, the need to improve operation adaptability at the film-forming step or the magnetic tape-preparing step has led to a demand for good slip characteristics for the surface of the film, and has made the slip properties of the magnetic tape crucial. Thus, it is required that a thermoplastic base film suitable for a magnetic recording medium have excellent smoothness and good slip characteristics.

As means for satisfying these requirements, there has been adopted a method in which fine particles are incorporated in a starting polymeric material for formation of a smooth film. According to this conventional technique, however, improvement of either the smoothness or slip characteristics results in degradation of the other. It has heretofore been impossible to improve both properties simultaneously.

A conventional magnetic recording tape is of the coating type, prepared by coating a base film with a magnetic paint comprising a magnetic powder and an organic polymer binder, and the coating layer is relatively thick, i.e., ordinarily 3 to 6μ (microns). Accordingly, convexities and concavities sufficient to cause drastic reduction of the electromagnetic performances seldom occur in the magnetic layer. Therefore, in a conventional base film for the magnetic recording medium, a method has been employed wherein finely divided particles are incorporated in the starting polymeric material or internal particles are formed in the starting polymeric material from the polymerization catalyst residue, whereby slip characteristics are imparted to the film.

However, this coating type magnetic recording medium does not meet the recent requirements for super-high magnetic recording density. Accordingly, a metallized film tape having a highly magnetic, thin metal surface layer formed by vacuum evaporation or sputtering without the use of a binder has become popular as a super high recording density video tape instead of the magnetic recording medium of the coating type.

The thickness of the magnetic metal layer of the above-mentioned metallized film tape is usually 0.05 to 0.2μ, much thinner than that in the magnetic tape of the coating type. Therefore, the surface configuration of the base film used is completely reproduced on the surface of the metallized film tape. Accordingly, if the surface roughness of the base film is large, the electromagnetic performance of the metal thin-film video tape is extremely reduced. In fact, even if a metal thin-film video tape formed from a finely divided particle-incorporated base film is used in a VTR (video tape recorder), no image is reproduced. Therefore, this tape cannot be used as a video tape.

In view of electromagnetic performance, a base film having quite a smooth surface is preferred. Although a vacuum-deposited metal film formed on a base film having a smooth surface is inferior in surface slip characteristics, a protecting film layer formed thereon can solve the problem.

The problem remaining to be solved is how to improve the running property of the non-magnetic layer side of the magnetic recording tape. In U.S. Pat. No. 4,233,352, it is taught that the running properties are improved by forming a coating layer on a smooth surface. However, it was found that under severe running conditions, for example, when the frequency of repeated use is extremely high, the running properties and durability are inferior to those of an ordinary fine particle-containing film. Accordingly, research was conducted with a view to eliminating this defect. We found that this defect can be eliminated in a laminated film having a smooth surface on which the magnetic recording layer is to be formed and having on the opposite surface a specific film layer containing fine particles having a regulated size.

In a base film wound in the form of a roll, the configuration of the coarse surface is transferred to the contacted smooth surface to degrade the smoothness. When a vacuum-deposited tape is prepared by running the film on a smooth cooling can, the front smooth surface is influenced by the coarse surface on the opposite side, also degrading the smoothness. Moreover, when the formed magnetic tape is wound in the form of a roll, the configuration of the coarse surface is transferred to the smooth surface, resulting in reduction of smoothness.

SUMMARY OF THE INVENTION

It is a primary object of the present invention to provide a laminated film suitable for a high density magnetic recording medium, on one surface of which a magnetic thin film can be formed, excellent in electromagnetic transformation performance, and the other surface of which has good sliding and running properties when in contact with a metal guide rod, and hence has excellent durability and does not cause degradation of the configuration of the magnetic thin film surface due to transfer of the configuration of the running surface.

Another object of the present invention is to provide a laminated film suitable for a high density magnetic recording medium, one surface of which is very smooth and has a vacuum-deposited magnetic metal thin film layer formed thereon in order to obtain superior electromagnetic transformation performance and the opposite side of which has a running surface excellent in running properties and durability, and wherein the configuration of the running surface is not transferred to the smooth surface kept in contact with the running surface in the wound state.

More specifically, in accordance with the present invention, there is provided a laminated film comprising (A) a layer composed of a thermoplastic resin and (B) a layer of a thermoplastic resin containing fine particles therein, wherein the surface roughness, expressed as the Ra value, of the outer surface of the layer (A) is smaller than 0.005μ, and the outer surface of the layer (B) is either (i) a surface having a surface roughness, expressed as the Ra value, of 0.005 to 0.04μ and having a plurality of depressions and a plurality of protrusions which are formed in a configuration such that at least one protrusion exists within each depression or at least one protrusion exists in the area where two or more depressions are contiguous to each other, or (ii) a surface having protrusions formed on a flat plane, and whose surface is covered with a layer (C) composed of a lubricant and having a surface roughness, expressed as the Ra value, of 0.005 to 0.04μ.

In the case where the outer surface of the layer (B) is an ordinary protrusion type surface having protrusions formed on a flat plane, the other surface is covered with a layer (C) composed of a lubricant for improving the running properties and durability. The outer surface of the layer (B) may be a surface having a plurality of depressions and a plurality of protrusions which are formed in a configuration such that at least one protrusion exists within each depression or at least one protrusion exists in the area where two or more depressions are contiguous to each other. Also in this case, as in case of the ordinary protrusion type surface, a covering layer (C) of a lubricant may be formed. The covering layer may be either a continuous film layer comprising a silicone resin, a surface active agent, a silane coupling agent, and, optionally, a wax, or a discontinuous film layer formed of worm-like nodules, which comprises a silicone resin, a silane coupling agent, a water-soluble high polymer, and, optionally, a wax.

DESCRIPTION OF THE PREFERRED EMBODIMENTS

Figure 1:
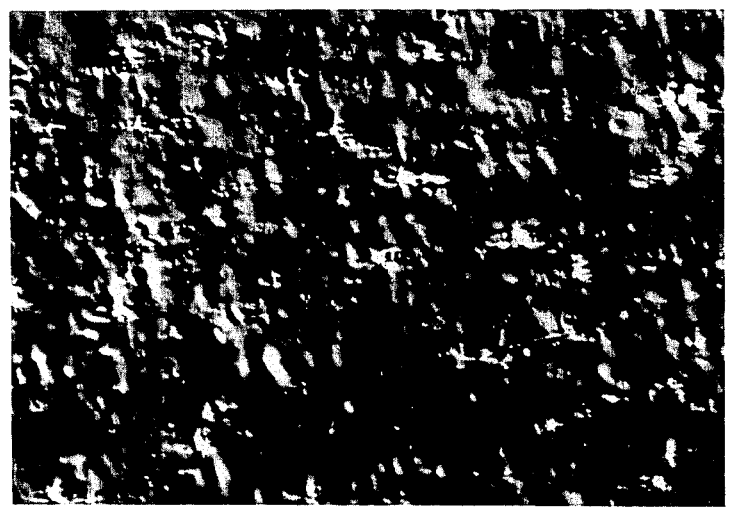
FIG. 1 is a photomicrograph of protrusions which are formed, together with depressions, on the outer surface of the layer (B) of the laminated film of the present invention, obtained by using a differential interference microscope.

By the term "thermoplastic resin" used in the present invention are meant thermoplastic polymers such as polyesters, polyamides, polycarbonates and polypropylene. Among these polymers, polyesters are preferred because they are excellent in both mechanical and thermal characteristics.

Any polyester composed mainly of linear polyesters may be used in the present invention. As typical examples, there can be mentioned polyethylene terephthalate, polytetramethylene terephthalate, poly-1,4-cyclohexylenedimethylene terephthalate, polyethylene-2,6-naphthalene dicarboxylate and polyethylene-p-hydroxybenzoate. Of course, these polyesters may be either homopolyesters or copolyesters. As the comonomer component used for the copolyester, there can be mentioned, for example, diol components such as diethylene glycol, propylene glycol, p-xylylene glycol and 1,4-cyclohexane dimethanol; dicarboxylic acid components such as adipic acid, sebacic acid, phthalic acid, isophthalic acid, 2,6-naphthalene dicarboxylic acid and 5-sodium sulfoisophthalate; polyfunctional dicarboxylic acid components such as trimellitic acid and pyromellitic acid; and p-hydroxyethoxybenzoic acid. In the case of a copolyester, the amount of the comonomer component is controlled to no more than 20 mole%.

The layer (A) composed of a thermoplastic resin is a layer not containing fine particles having a particle size larger than 0.5μ in the thermoplastic resin, preferably a layer substantially free of fine particles. The layer (B) of a thermoplastic resin is a layer containing fine particles. It is preferred that the layers (A) and (B) be monoaxially or more preferably biaxially oriented.

The fine particles are those formed by reaction of the residue of a polymerization catalyst for formation of a thermoplastic resin with monomers or oligomers, as disclosed in U.S. Pat. Nos. 4,138,386 and 4,067,855, for example, in a polyester resin, fine particles of a polymer-insoluble composition formed by reaction of a catalyst residue containing Ca, Si, Mn, Mg, Sb, Ge, P, Li, K, Na or the like with monomers or oligomers during the polyester-forming polymerization reaction, and/or inactive inorganic particles of aluminum oxide, silicon oxide, barium sulfate, and calcium carbonate, though fine particles that can be used in the present invention are not limited to those exemplified above.

It is preferred that the particle size of these fine particles be 0.5 to 5μ, especially 1 to 3μ, and that the amount of the fine particles be 0.01% to 1.0% by weight, especially 0.02% to 0.5% by weight.

The outer surface of the layer (A) of the laminated film of the present invention is the surface of the layer (A) that is not contacted with the layer (B). This outer surface is so smooth that the surface roughness is less than 0.005μ as determined as an Ra value at a cut-off value of 0.25 mm according to the method of DIN 4768.

The outer surface of the layer (B) of the laminated film of the present invention is the surface of the layer (B) that is not contacted with the layer (A). One embodiment of the outer surface of the layer (B) is an ordinary protrusion type surface having protrusions formed on a flat plane and whose surface is covered with a layer (C) composed of a lubricant.

A preferred lubricant layer is made from a combination of the materials which are selected from a silicone resin, a surface active agent, a silane coupling agent, and water-soluble polymer and wax. Each component will now be described.

(a) Silicone Resin [hereinafter referred to as "component (a)"]:

Component (a) has a molecular weight of 30,000 to 300,000. As a preferred example, there can be mentioned a silicone resin comprising a chain represented by the following formula:

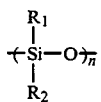

wherein $R_1$ is $CH_3$, $C_6H_5$, or H, $R_2$ is $CH_3$, $C_6H_5$, H, or a functional group such as an epoxy, amino, or hydroxyl group, and n is an integer of 100 to 7,000 giving the above-mentioned molecular weight by $R_1$ and $R_2$, and having epoxy, amino, hydroxyl, or other functional terminal groups at the molecule ends. In the present invention, the silicone resin does not necessarily have to be a homopolymer. A copolymer or a mixture of several homopolymers may be used. The molecular weight of the silicone resin is preferably in the range of from 30,000 to 300,000. If the molecular weight is lower than 30,000, the covering layer becomes too soft. If the molecular weight is higher than 300,000, the covering layer becomes brittle.

(b) Surface Active Agent [hereinafter referred to as "component (b)"]:

Use of anionic surface active agents, cationic surface active agents, and nonionic surface active agents as component (b) is preferred. The HLB value of the component (b) is preferably in the range of from 5 to 50. Component (b) is used for homogenization of the components. If the amount of the component (b) is too small, the homogeneity of the mixture of the components is decreased. If the amount of the component (b) is too large, the durability of the covering layer is decreased.

(c) Silane Coupling Agent [hereinafter referred to as "component (c)"]:

Component (c) is used for providing bondability between the components and the plastic base film. The component (c) is an organic silicon monomer containing at least two different reactive groups in the molecule. One of the reactive groups is selected from the methoxy, ethoxy and silanol groups. The other reactive group is selected from the vinyl, epoxy, methacrylic, amino and mercapto groups. Reactive groups capable of coupling with side chain groups and terminal groups of the silicone resin are selected. A mono- or di-organoalkoxysilane is ordinarily used as the silane coupling agent. For example, there may be used vinyltrichlorosilane, vinyltriethoxysilane, vinyl-tris(β-methoxyethoxy)silane, γ-glycidoxypropyltrimethoxysilane, γ-methacryloxypropylmethoxysilane, N-β-(aminoethyl)-γ-aminopropyltrimethoxysilane, N-β-(aminoethyl)-γ-aminopropylmethyldimethoxysilane, γ-chloropropyltrimethoxysilane, γ-mercaptopropyltrimethoxysilane and γ-aminopropyltriethoxysilane, If the amount of component (c) is too small, the bonding between the lubricant layer (C) and the plastic base film is insufficient. If the amount of component (c) is too large, the covering layer is brittle and the durability is reduced.

(d) Water-Soluble Polymer [hereinafter referred to as "component (d)"]:

A water-soluble polymer having a molecular weight of 10,000 to 2,000,000, preferably 100,000 to 1,000,000, is used as component (d). If the molecular weight is lower than 10,000, the covering layer becomes too soft, retention of the structure becomes difficult and durability is reduced. If the molecular weight exceeds 2,000,000, the covering layer becomes too hard and brittle, and durability is reduced. As the water-soluble polymer, there can be mentioned polyvinyl alcohol, tragacanth gum, gum arabic, casein, gelatin, methyl cellulose, hydroxyethyl cellulose, and carboxymethyl cellulose. Among these water-soluble polymers, there are preferably used cellulose type water-soluble polymers such as methyl cellulose, hydroxyethyl cellulose, and carboxymethyl cellulose.

(e) Wax [hereinafter referred to as "component (e)"]:

As component (e), there may be used waxes such as insect wax, spermaceti, carnauba wax and bees wax.

The layer (C) formed on the outer surface of the layer (B) of the laminated film is classified into the entire surface uniform covering layer and the discontinuous covering layer formed of worm-like nodules according to the kind of the lubricant selected and used.

As the lubricant to be used for formation of the entire surface uniform covering layer, there is used a composition comprising the above-mentioned silicone resin (a), surface active agent (b), silane coupling agent (c) and, preferably, wax (e).

In this case, it is preferred that the silicone resin (a)/surface active agent (b)/silane coupling agent (c)/wax (e) weight ratio be in the range of (10–100)/(5–20)/(5–100)/(0–200). The thickness of the covering layer is 1 to 1,000 mg/m², preferably 2 to 500 mg/m², as solids. Both components (a) and (e) are lubricants. If the amount of component (a) is too large or too small, durability is reduced. If the amount of the wax (e) is too large, durability is also reduced.

As the lubricant to be used for formation of the discontinuous covering layer formed of worm-like nodules, there is used a composition comprising the above-mentioned silicone resin (a), silane coupling agent (c), water-soluble polymer (d) and, preferably, wax (e).

In this case, it is preferred that the silicone resin (a)/silane coupling agent (c)/water-soluble polymer (d)/wax (e) weight ratio be in the range of (10–100)/(5–100)/(10–200)/(0–200). The thickness of the covering layer is 1 to 1,000 mg/m², preferably 2 to 500 mg/m², as solids.

Components (a) and (e) are lubricating components. If the amount of component (a) is too large or too small, durability is reduced. If the amount of the component (e) is too large, durability is also reduced. Component (d) is a component for forming the covering structure of worm-like nodules. If the amount of component (d) is too small, retention of this covering structure becomes difficult. If the amount of component (d) is too large, durability is reduced. Component (c) is used for providing bondability between the components and the plastic base film. If the amount of layer (C) is too small, the bonding is insufficient and the durability is reduced. If the amount of component (c) is too large, the covering layer becomes brittle and the durability is reduced.

Figure 2:
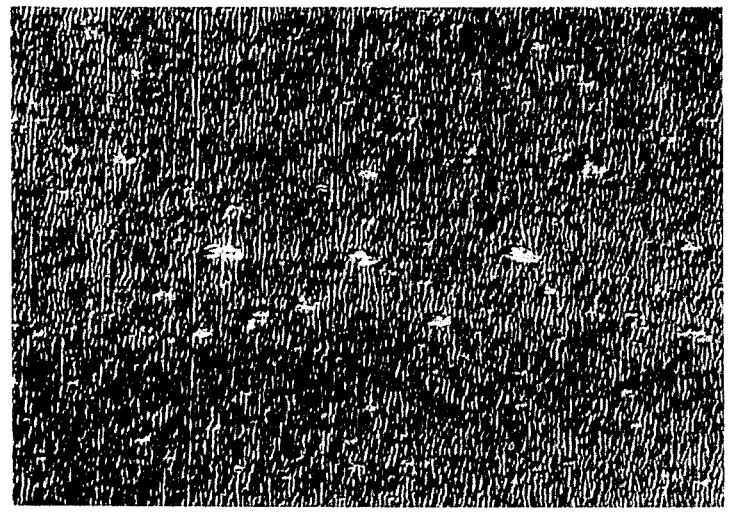
FIG. 2 is a photomicrograph of an easily-slipping film layer formed of worm-like nodules on the outer surface of the layer (B) of the laminated film of the present invention, obtained by using a differential interference microscope.

The surface structure of this discontinuous covering layer formed of worm-like nodules is as shown in a photomicrograph (500 magnification) of FIG. 2 taken by using a differential interference microscope.

The surface roughness of the covering layer is 0.005 to 0.040μ, preferably 0.005 to 0.030μ, as expressed as the Ra value at a cut-off value of 0.25 mm. If the Ra value is smaller than the lower limit, the running properties of this surface on a metal roll and a guide rod are degraded. Namely, the running properties and durability are degraded. If the Ra value is larger than the upper limit, the surface roughness is increased. When the base film is wound in the form of a roll in the tape-manufacturing process or the magnetic tape is wound on a reel, the configuration of this surface is transferred to the film-formed surface, resulting in reduction of the smoothness of the film-formed surface.

Another example of the outer surface of the layer (B) is a surface having a plurality of depressions and a plurality of protrusions in a configuration such that at least one protrusion exists within each depression or at least one protrusion exists in the area where two or more depressions are contiguous to each other, as typically shown in a photomicrograph (1,000 magnification) of FIG. 1 taken by using a differential interference microscope. In this outer surface, it is preferred that the area fraction of the depressions be in the range of from $1 \times 10^{-3}$ to $6 \times 10^{-1}$. By the term "area fraction of the depressions" is meant the ratio of the area of the depressions to the area of the observation visual field. The area fraction of depressions is calculated from the following equation:

$$\text{Area fraction} = \left( \sum_i n_i D_i \right) / S$$

wherein $D_i$ is an area of a certain depression and $n_i$ is the number of depressions having an area of $D_i$.

The surface having these protrusions and depressions will now be described with reference to FIGS. 3 through 6.

Figure 3A:
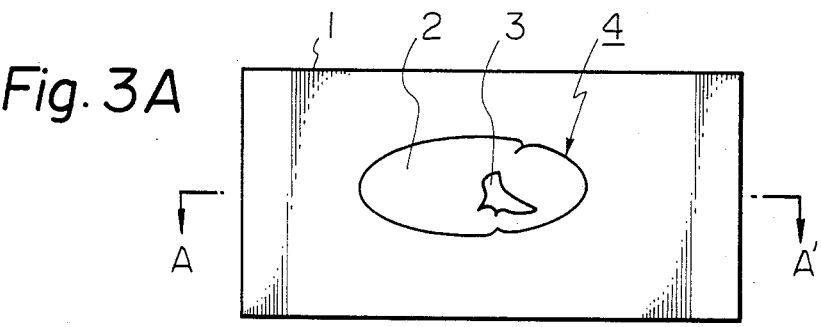
FIG. 3A is a diagrammatic plane view of a depression having a protrusion therein and FIG. 3B is a diagrammatic cross-sectional view of the depression cut along the line A—A' in FIG. 3A.
Figure 3B:
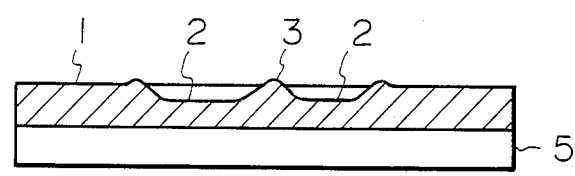
Figure 4A:
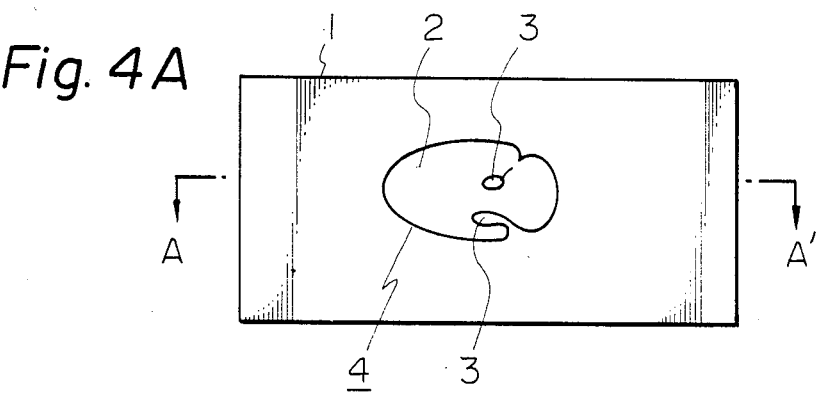
FIG. 4A is a diagrammatic plane view of a depression having protrusions therein and FIG. 4B is a diagrammatic cross-sectional view of the depression cut along the line A—A' in FIG. 4A.
Figure 4B:
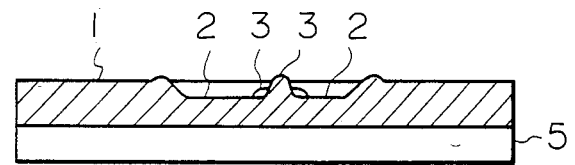

Referring to FIGS. 3A and 3B and FIGS. 4A and 4B, a plurality of depression-protrusion combinations 4 are formed on the surface of the layer (B) (layer 1). Each combination comprises a depression 2 and one or more protrusions 3 present in the depression. The number of the protrusion 3 present in each depression may be one as shown in FIGS. 3A and 3B or plural as shown in FIGS. 4A and 4B. The shape of the depression 2 is not particularly critical. The depression may be elliptical (see FIG. 4A), long elliptical (see FIG. 3A), or gourd-shaped. The protrusion 3 may be present in any position within each depression 2. Reference numeral 5 represents the layer (A) of the laminated film.

Figure 5A:
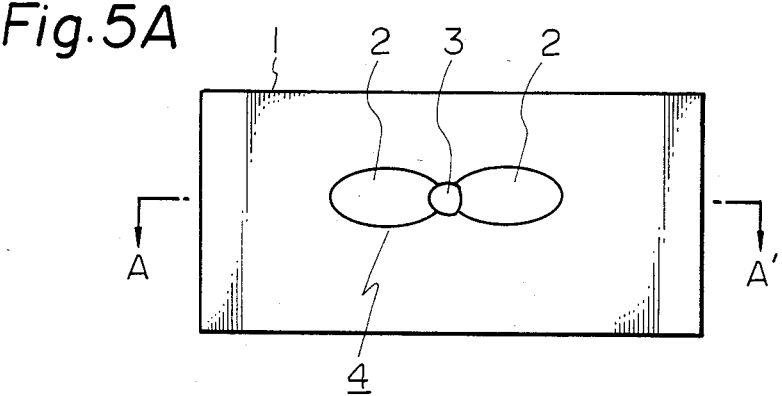
FIG. 5A is a diagrammatic plane view of depressions having a protrusion in the area where the depressions are contiguous to each other and FIG. 5B is a diagrammatic cross-sectional view of the depressions cut along the line A—A' in FIG. 5A.
Figure 5B:
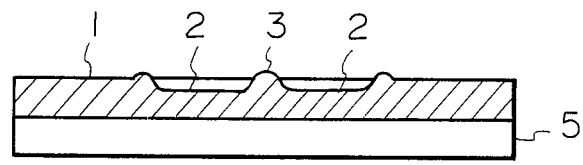
Figure 6:
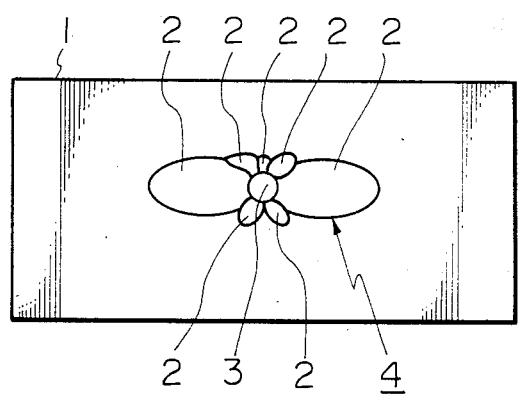
FIG. 6 is a diagrammatic plane view of depressions having a protrusion in the area where the depressions are contiguous to each other.
Figure 7:
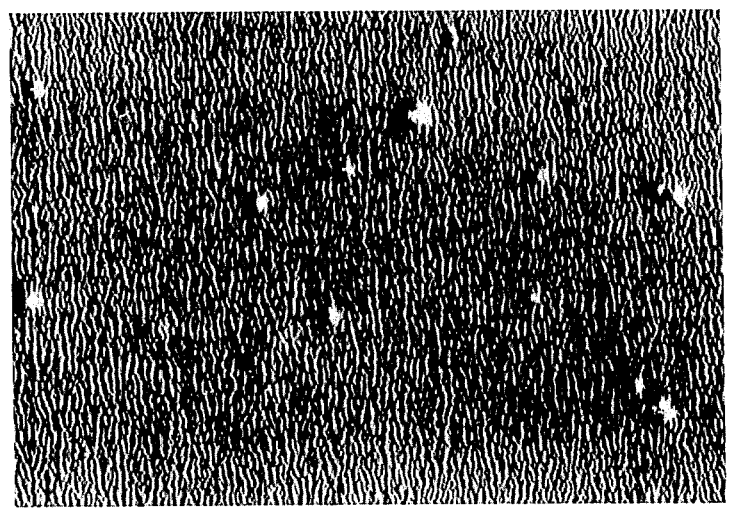
FIG. 7 is a photomicrograph of the laminated film of the present invention in which protrusions are formed on the outer surface of the layer (B) and a discontinuous film of worm-like nodules is formed on the protrusions, obtained by using a differential interference microscope.

Referring to FIGS. 5A and 5B and FIG. 6, one or more protrusions 3 are formed in the area where two or more depressions are contiguous to each other. More specifically, a protrusion may occupy the area where two elliptical depressions 2 are contiguous to each other as shown in FIG. 5A, or a protrusion 3 may occupy the area where seven depressions are contiguous to one another as shown in FIG. 6.

The roughness of the surface having protrusions and depressions formed thereon is 0.005 to 0.040μ, preferably 0.005 to 0.030μ, as expressed as the Ra value at a cut-off value of 0.25 mm.

When the outer surface is one on which protrusions exist within depressions or protrusions exist in the areas where depressions are contiguous to one another, the covering layer as mentioned above need not be used. However, in order to further improve the running properties and durability, it is preferred that the covering layer of a lubricant as mentioned above be formed on the outer surface having the above-mentioned protrusions and depressions formed thereon. As in the foregoing embodiment, the covering lubricant layer may be either an entire surface uniform covering layer or a discontinuous covering layer formed of worm-like nodules in the present embodiment. In each case, the surface roughness Ra value is 0.005 to 0.040μ, preferably 0.005 to 0.030μ, at a cut-off value of 0.25 mm. Whether the outer surface has a covering layer or has no covering layer, if the Ra value is smaller than the lower limit value, reduction of the running properties of this surface on a metal roll or guide rod may occur. More specifically, the running properties and durability tend to decrease. If the Ra value is larger than the upper limit value, the surface roughness is too large. When the base film is wound in the form of a roll or when a tape is prepared or a magnetic tape is wound on a reel, the configuration of this surface is transferred to the thin-film formed surface and there is a fear of reduction of the surface smoothness of the thin-film formed surface.

The process for the production of the laminated film of the present invention will now be described.

The laminated film of the present invention may be prepared by adopting the technique of co-extrusion in the conventional plastic film-manufacturing process. The starting material from which particles contained in the polymer are removed as completely as possible is used for the layer (A), and the starting material in which fine particles are positively incorporated is used for the layer (B). These two starting materials are co-extruded in the form of a sheet. If necessary, then, a solution or emulsion containing the above-mentioned lubricant components is coated on the outer surface of the layer (B) of the co-extruded film and the coated film is dried and drawn to form a laminated film in which one surface is a smooth surface and the other surface is a surface of the ordinary protrusion type having a covering lubricant layer formed thereon. If necessary, this drawn film is heat-set to form a laminated film in which one surface is a smooth surface and the other surface is an ordinary protrusion type surface having a covering lubricant layer formed thereon.

When a depression-forming step is placed after the co-extrusion step in the above-mentioned film-manufacturing process, there can be obtained a laminated film in which the outer surface of the layer (A) is smooth and the outer surface of the layer (B) has protrusions and depressions formed thereon in a configuration such that the protrusions exist within the depressions or in the areas where the depressions are contiguous to each other. As the depression-forming means, there is advantageously adopted a method in which after the extrusion or first drawing, a volatile polar solvent such as acetone or methanol is coated on the layer (B) to etch the surface. However, the method that can be adopted in the present invention is not limited to this method. The drawn film may be heat-set according to need.

In order to further improve the sliding properties and durability, there may be adopted a method in which a solution or emulsion composed mainly of the above-mentioned lubricant is coated on the outer surface of the layer (B) in the film-forming process and the coated film is dried and drawn.

A magnetic layer, preferably a thin film of a ferromagnetic substance may be formed on the surface A of the laminated film of the present invention. More specifically, a ferromagnetic substance, for example, such as Fe, Co, Ni, an alloy thereof or an alloy of such a metal with other non-magnetic material is formed on the surface of the layer (A) in the form of a thin film preferably having a thickness of 500 to 2,000 Å by vacuum evaporation, sputtering or plating.

It is preferred that a protective organic compound layer be formed on the surface of the magnetic layer. As the protective organic compound layer, there can be mentioned a protective layer comprising an adhesive component such as an epoxy resin or a vinyl chloride/-vinyl acetate copolymer resin, a lubricating component such as a silicone resin or a wax, and an additive component such as a silane coupling agent, though the protective layer that can be used is not limited to this protective layer.

The thickness of the protective layer is 0.01 to 0.50$\mu$, preferably 0.1 to 0.2$\mu$. Because of the presence of this protective layer, the surface of the magnetic layer is prevented from directly contacting the guide or magnetic head in a VTR. Since the smoothness of the base film surface is very excellent, the surface of the thin film of the magnetic substance is very smooth. Therefore, the electromagnetic transformation performance of the obtained magnetic recording medium is highly improved. Moreover, due to the protective organic compound film layer, the magnetic surface is excellent in sliding properties, and occurrence of the sticking phenomenon or formation of scratches due to contact with the rotary drum head at the time of the actual running operation in a VTR can be prevented.

Properties of magnetic tapes referred to in the instant specification are evaluated by repeated recording and reproduction using a commercially available VTR of the VHS system.

The running characteristics (scratch resistance, easily sliding property, and durability) of the tape are evaluated by repeating the running operation for reproduction 500 times and examining the surface of the tape on the running side to check whether or not scratches are formed on the surface on the running side.

The signal-to-noise (S/N) ratio of the tape is determined by recording a 50% white label signal at an optimum recording current for the tape to be tested and comparing the ratio of the signal to the noise contained in a video demodulation signal at the time of reproduction with that of a commercially available standard tape of the VHS system as 0 dB.

The drop-out characteristic is determined by recording a three-staged step wave signal at an optimum recording current on the magnetic recording tape to be tested, counting with a drop-out counter the number of drop-outs in which the attenuation quantity of the video output at the time of reproduction is larger than 18 dB and the duration time is at least 20 microseconds, and calculating a mean value per minute.

The present invention will now be described in detail with reference to the following examples, which by no means limit the scope of the invention.

EXAMPLE 1

Polyethylene terephthalate substantially free of internal particles formed by reaction of the polymerization catalyst residue with monomers or oligomers in the polymerization stage, as the starting material for the layer (A), and polyethylene terephthalate containing 0.2% by weight of internal particles having a particle size of 1.5$\mu$, which were formed by reaction of the polymerization catalyst residue with monomers or oligomers in the polymerization stage, as the starting material for the layer (B), were melted and co-extruded at a thickness ratio of 1/1, and the co-extrudate was drawn at a draw ratio of 2.7 in the longitudinal direction. Acetone was coated on the outer surface of the layer (B) and the coated surface was dried. By this procedure the outer surface of the layer (B) was etched. Then, the film was passed through a tenter at 90° C. and drawn at a draw ratio of 3.7 in the transverse direction. Then, the film was heat-treated at 200° C. to obtain a biaxially drawn polyester laminated film having a thickness of 12$\mu$, in which the outer surface of the layer (A) (hereinafter referred to as "surface A") had an Ra value of 0.003$\mu$ at a cut-off value of 0.25 mm and the outer surface of the layer (B) (hereinafter referred to as "surface B") comprised protrusions existing within depressions or in the areas where depressions were contiguous to each other and had an Ra value of 0.014$\mu$ at a cut-off value of 0.25 mm.

A thin film of a cobalt-iron alloy having a thickness of 1,500 Å was formed on the surface A of the polyester film by vacuum evaporation. Then, a protective film comprising an epoxy resin, a silicone resin and a silane coupling agent was formed at a thickness of 0.1$\mu$ on the surface of the cobalt-iron alloy thin film. Then, the formed laminated film was cut in the longitudinal direction in a predetermined width to obtain a magnetic tape having properties as shown in Table 1.

EXAMPLE 2

The procedures of Example 1 were repeated in the same manner except that an aqueous emulsion B comprising (A) 0.40% by weight of an epoxidized polydimethylsiloxane emulsion, (B) 0.050% by weight of a silane coupling agent [N-$\beta$-(aminoethyl)-$\gamma$-aminopropylmethyldimethoxysilane], and (C) 0.20% by weight of an alkylphenol type non-ionic surface active agent was coated on the surface (B) of the film, which had been coated with acetone and then dried, and temperature of the tenter zone was 115° C. The properties of this magnetic tape are shown in Table 1.

EXAMPLE 3

A magnetic tape having a surface formed of worm-like nodules was prepared in the same manner as described in Example 2 except that an aqueous emulsion B comprising (A) 0.40% by weight of an epoxidized polydimethylsiloxane emulsion, (B) 0.050% by weight of a silane coupling agent [N-$\beta$-(aminoethyl)-$\gamma$-aminopropylmethyldimethoxysilane], and (C) 0.20% by weight of methyl cellulose was used instead of the aqueous emulsion B used in Example 2. A magnetic tape having a film of worm-like nodules was thus obtained. The properties of this magnetic tape are shown in Table 1.

EXAMPLE 4

Polyethylene terephthalate which is substantially free from internal particles resulting from the polymerization catalyst residue, as the starting material for the layer (A), and polyethylene terephthalate containing 0.2% by weight of internal particles having a particle size of 1.5$\mu$, which were formed by reaction of polymerization catalyst residues with monomers or oligomers in the polymerization stage, as the starting material for the layer (B), were melted and co-extruded at a thickness ratio of 1/1, and the co-extrudate was drawn at a draw ratio of 3 in the longitudinal direction. Then aqueous emulsion B comprising (A) 0.40% by weight of an epoxidized polydimethylsiloxane emulsion, (B) 0.050% by weight of a silane coupling agent [N-$\beta$-(aminoethyl)-$\gamma$-aminopropylmethyldimethoxysilane], and (C) 0.20% by weight of an alkylphenol type nonionic surface active agent was coated on the outer surface of the layer (B) containing internal particles. Then, the film was passed through a tenter, dried and preheated at 115° C., and the film was drawn in the transverse direction at a draw ratio of 3. Then, the film was heat-treated at 200° C. to obtain a biaxially drawn polyester laminated film having a thickness of 12μ, in which the outer surface of the layer (A) had a surface roughness Ra value of 0.003μ at a cut off value of 0.25 mm and the outer surface of the layer (B) had a continuous covering layer composed mainly of a lubricant and having a surface roughness Ra value of 0.014μ at a cut-off value of 0.25 mm.

A thin film of a cobalt-iron alloy having a thickness of 1,500 Å was formed on the surface A of this film by vacuum evaporation. Then, a protective film layer comprising an epoxy resin, a silicone resin and a silane coupling agent was formed in a thickness of 0.1μ on the surface of the cobalt-iron alloy thin film. Then, the polyester film was cut in the longitudinal direction in a predetermined width to obtain a magnetic tape having properties as shown in Table 1.

EXAMPLE 5

The procedures of Example 4 were repeated in the same manner except that an aqueous emulsion comprising (A) 0.40% by weight of an epoxidized polydimethylsiloxane emulsion, (B) 0.050% by weight of a silane coupling agent [N-β-(aminoethyl)-γ-aminopropylmethyldimethoxysilane], and (C) 0.20% by weight of methyl cellulose was used instead of the aqueous emulsion B used in Example 4. There was obtained a biaxially drawn polyester laminated film having a thickness of 12μ, in which the surface A had a surface roughness Ra value of 0.003μ at a cut-off value of 0.25 mm and the surface B comprised a surface film formed of worm-like nodules and had a surface roughness Ra value of 0.015μ at a cut-off value of 0.25 mm. A magnetic tape having properties as shown in Table 1 was prepared from this base film in the same manner as described in Example 4.

COMPARATIVE EXAMPLE 1

A magnetic tape was prepared in the same manner as described in Example 1 except that $SiO_2$ particles having a particle size of 3μ were incorporated in an amount of 0.02% by weight into the starting material for the layer (A) to obtain a film with surface A having an Ra value of 0.010μ. The properties of the magnetic tape are shown in Table 1.

COMPARATIVE EXAMPLE 2

A magnetic tape was prepared in the same manner as described in Example 1 except that $SiO_2$ particles having a particle size of 3μ were incorporated in an amount of 0.03% by weight into the starting material for the layer (B) to obtain a film with surface B having an Ra value of 0.050μ. The properties of the magnetic tape are shown in Table 1.

COMPARATIVE EXAMPLE 3

A magnetic tape was prepared in the same manner as described in Example 1 except that 5/6 of the starting material for the layer (B) was substituted by the starting material for the layer (A) to reduce the amount of internal particles in the layer (B) and obtain a film with surface B having an Ra value of 0.004μ. The properties of the magnetic tape are shown in Table 1.

COMPARATIVE EXAMPLE 4

The procedures of Example 4 were repeated in the same manner except that $SiO_2$ particles having a particle size of 3μ were incorporated in an amount of 0.03% by weight into the starting polyethylene terephthalate containing internal particles formed by reaction of the polymerization catalyst residue with monomers or oligomers in the polymerization stage. There was obtained a biaxially drawn polyester laminated film having a thickness of 12μ, in which the surface A had an Ra value of 0.003μ at a cut-off value of 0.25 mm and the surface B comprised a continuous covering layer composed mainly of a lubricant and had an Ra value of 0.050μ at a cut-off value of 0.25 mm.

A magnetic tape was prepared from this base film in the same manner as described in Example 4. The properties of the magnetic tape are shown in Table 1.

COMPARATIVE EXAMPLE 5

The procedures of Example 4 were repeated in the same manner except that 5/6 of the starting polyethylene terephthalate containing internal particles formed by reaction of the polymerization catalyst residue with monomers or oligomers in the polymerization stage was replaced by polyethylene terephthalate substantially free of the internal particles to reduce the amount of the internal particles. There was obtained a biaxially drawn polyester laminated film having a thickness of 12μ, in which the surface A had an Ra value of 0.003μ at a cut-off value of 0.25 mm and the surface B comprised a continuous covering layer composed mainly of a lubricant and had an Ra value of 0.004μ at a cut-off value of 0.25 mm.

A magnetic tape was prepared from this base film in the same manner as described in Example 4. The properties of the magnetic tape are shown in Table 1.

TABLE 1

| | Surface Structure of Base Film | | Running Property of Non-Magnetic Surface (scratch resistance) | Magnetic Characteristics | |
|---|---|---|---|---|---|
| | Surface Roughness Ra (μ) of Layer (A) | Surface Roughness Ra (μ) of Layer (B) | | S/N Ratio (dB) | Number of Drop-Outs per Minute |
| Example 1 | 0.003 | 0.014 | B | +13 | 20 |
| Example 2 | 0.003 | 0.014 | B-A | +13 | 20 |
| Example 3 | 0.003 | 0.015 | B-A | +13 | 20 |
| Example 4 | 0.003 | 0.014 | B | +13 | 20 |
| Example 5 | 0.003 | 0.015 | A | +13 | 20 |
| Comparative Example 1 | 0.010 | 0.014 | B | −6 | 250 |
| Comparative Example 2 | 0.003 | 0.050 | A | −5 | 40 |
| Comparative Example 3 | 0.003 | 0.004 | C | +13 | 180 |
| Comparative Example 4 | 0.003 | 0.050 | A | −5 | 40 |

TABLE 1-continued

| | Surface Structure of Base Film | | | Magnetic Characteristics | |
|---|---|---|---|---|---|
| | Surface Roughness Ra (μ) of Layer (A) | Surface Roughness Ra (μ) of Layer (B) | Running Property of Non-Magnetic Surface (scratch resistance) | S/N Ratio (dB) | Number of Drop-Outs per Minute |
| Comparative Example 5 | 0.003 | 0.004 | C | +10 | 180 |

Note
The scratch resistance was evaluated according to the following rating.
A: no scratches observed
B: slight formation of very small scratches observed
C: prominent formation of scratches observed As is apparent from the results shown in Table 1, in a magnetic recording medium obtained by forming a thin film of a ferromagnetic substance on the surface A of the laminated film of the present invention comprising a layer (A) of a thermoplastic resin and a layer (B) of a fine particle-containing thermoplastic resin, in which the outer surface A of the layer (A) is a smooth surface having a surface roughness, expressed as the Ra value at a cut-off value of 0.25 mm, of less than 0.005μ and the outer surface B of the layer (B) is an ordinary protrusion type surface having a covering lubricant layer formed thereon or a surface having a plurality of depressions and a plurality of protrusions, which are formed in a configuration such that at least one protrusion exists within each depression or at least one protrusion exists in the area where two or more depressions are contiguous to each other, the surface having a surface smoothness, expressed as the Ra value at a cut-off value of 0.25 mm, of 0.005 to 0.040μ, a covering lubricant layer being optionally formed on the surface, and forming a protective organic compound layer on the thin film of the ferromagnetic substance, good running properties are attained in actual operation, and the electromagnetic transformation performance is very excellent. Accordingly, this magnetic tape is very suitable as a video tape for a small VTR or portable VTR. When a covering layer composed mainly of a lubricant is formed on the surface B of the layer (B) and this laminated film is used for a magnetic recording medium, the running properties of the non-magnetic surface are further improved.

We claim:

1. A laminated film for use in high density, metallized magnetic recording media comprising (A) a smooth surfaced layer composed of a thermoplastic resin and (B) a rougher surfaced layer of a thermoplastic resin containing fine particles therein, wherein the surface roughness, expressed as the Ra value, of the outer surface of the layer (A) is smaller than 0.005 and the outer surface of the layer (B) is a surface having protrusions formed on a flat plane, and whose surface is covered with a layer (C) having a surface roughness, expressed as the Ra value, of 0.005 to 0.04μ and said layer (c) being a continous film layer comprising a silicone resin, at least one surface active agent selected from the group consisting of anionic, cationic and non-ionic surface active agents, a silane coupling agent which is an organic silicone monomer having at least two different reactive groups in the molecule, and a wax, wherein the ratio by weight of silicone resin/surface active agent/silane coupling agent/wax is in the range of (10–100)/(5–20)/(5–100)/(0–200).

2. A laminated film as set forth in claim 1, wherein the roughness, expressed as the Ra value, of the outer surface of the layer (C) is in the range of from 0.005 to 0.030μ.

3. A laminated film for use in high density, metallized magnetic recording media comprising (A) a layer composed of a thermoplastic resin and (B) a layer of a thermoplastic resin containing fine particles therein, wherein the surface roughness, expressed as the Ra value, of the outer surface of the layer (A) is smaller than 0.005 and the outer surface of the layer (B) has a surface roughness, expressed as the Ra value, of 0.005 to 0.04μ and has a plurality of depressions and a plurality of protrusions which are formed in a configuration such that at least one protrusion exists within each depression or at least one protrusion exists in the area where two or more depressions are contiguous to each other, said outer surface of the layer (B) being covered with a layer (C) which is a continous film layer comprising a silicone resin, at least one surface active agent selected from the group consisting of anionic, cationic and non-ionic surface active agents, a silane coupling agent which is an organic silicone monomer having at least two different reactive groups in the molecule, and a wax, wherein the ratio by weight of silicone resin/surface active agent/silane coupling agent/wax is in the range of (10–100)/(5–20)/5–100)/(0–200).

4. A laminated film as set forth in claim 1 or 3, wherein the HLB value of the surface active agent is in the range of from 5 to 50.

5. A laminated film for use in high density, metallized magnetic recording media comprising (A) a smooth surfaced layer composed of a thermoplastic resin and (B) a rougher surfaced layer of a thermoplastic resin containing fine particles therein, wherein the surface roughness, expressed as the Ra value, of the outer surface of the layer (A) is smaller than 0.005 and the outer surface of the layer (B) is a surface having protrusions formed on a flat plane, and whose surface is covered with a layer (C) having a surface roughness, expressed as the Ra value, of 0.005 to 0.04μ, and said layer (C) being a discontinous film layer formed of worm-like nodules, which comprise a silicone resin, a silane coupling agent which is an organic silicone monomer having at least two different reactive groups in the molecule, a water-soluble polymer having a molecular weight of from 10,000 to 2,000,000, and a wax, wherein the ratio by weight of silicone resin/silane coupling agent/water-soluble polymer/wax is in the range of (10–100)/(5–100)/(10–200)/(0–200).

6. A laminated film for use in high density, metallized magnetic recording media comprising (A) a layer composed of a thermoplastic resin and (B) a layer of a thermoplastic resin containing fine particles therein, wherein the surface roughness, expressed as the Ra value, of the outer surface of the layer (A) is smaller than 0.005 and the outer surface of the layer (B) has a surface roughness, expressed as the Ra value, of 0.005 to 0.04μ and has a plurality of depressions and a plurality of protrusions which are formed in a configuration such that at least one protrusion exists within each depression or at least one protrusion exists in the area where two or more depressions are contiguous to each other, said outer surface of the layer (B) being covered with a layer (C) which is a discontinuous film layer formed of worm-like nodules, which comprises a silicone resin, a silane coupling agent which is an organic silicone monomer having at least two different reactive groups in the molecule, a water-soluble polymer having a molecular weight of from 10,000 to 2,000,000, and a wax, wherein the ratio by weight of silicone resin/silane coupling agent/water-soluble polymer/wax is in the range of (10–100)/(5–100)/(10–200)/(0–200).

7. A laminated film as set forth in claim 4 or 6, wherein the water-soluble polymer is at least one polymer selected from the group consisting of polyvinyl alcohol, tragacanth gum, gum arabic, casein, gelatin, methyl cellulose, hydroxyethyl cellulose and carboxymethyl cellulose.

8. A laminated film as set forth in claim 5 or 6, wherein the water-soluble polymer is at least one polymer selected from the group consisting of methyl cellulose, hydroxyethyl cellulose and carboxymethyl cellulose.

9. A laminated film as set forth in claim 1, 3, 5 or 6, wherein each of the thermoplastic resins in the layer (A) and the layer (B) has at least one member selected from the group consisting of polyesters, polyamides, polycarbonates and polypropylenes.

10. A laminated film as set forth in claim 1, 3, 5 or 6, wherein the silicone resin is a polysiloxane having a molecular weight of 30,000 to 300,000.

11. A laminated film as set forth in claim 1, 3, 5 or 6, wherein the silicone resin is a compound represented by the following general formula:

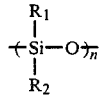

wherein $R_1$ is $CH_3$, $C_6H_5$ or H, $R_2$ is $CH_3$, $C_6H_5$, H, an epoxy group, an amino group or a hydroxyl group, and n is a number of from 100 to 7,000, and has functional terminal groups selected from the group consisting of epoxy, amino and hydroxyl groups at the ends thereof.

12. A laminated film as set forth in claim 1, 3, 5 or 6, wherein the silane coupling agent is a mono- or di-organoalkoxysilane.

13. A laminated film as set forth in claim 1, 3, 5 or 6, wherein one of at least two different groups of the silane coupling agent is a group selected from the group consisting of methoxy, ethoxy and silanol groups and the other reactive group is a group selected from the group consisting of vinyl, epoxy, methacrylic, amino and mercapto groups.

14. A laminated film as set forth in claim 1, 3, 5 or 6, wherein the silane coupling agent is an aminosilane type compound.

15. A laminated film as set forth in claim 1, 3, 5 or 6, wherein the silane coupling agent is at least one organic silane compound selected from the group consisting of vinyltrichlorosilane, vinyltriethoxysilane, vinyltris(β-methoxyethoxy)silane, γ-methacryloxypropyltrimethoxysilane, N-β-(aminoethyl)-γ-aminopropyltrimethoxysilane, N-β-(aminoethyl)-γ-aminopropylmethyldimethoxysilane, γ-chloropropyltrimethoxysilane, γ-mercaptopropyltrimethoxysilane and γ-aminopropyltriethoxysilane.

16. A laminated film as set forth in claim 1, 3, 5, or 6, wherein each of the thermoplastic resin layers (A) and (B) is a biaxially oriented polyester film.

17. A laminated film as set forth in claim 1, 3, 5, or 6, wherein each of the thermoplastic resins in the layer (A) and the layer (B) is a polyester.

18. A laminated film as set forth in claim 17, wherein the polyester is at least one member selected from the group consisting of polyethylene terephthalate, polytetramethylene terephthalate, poly-1,4-cyclohexylenedimethylene terephthalate, polyethylene-2,6-naphthalene dicarboxylate, polyethylene-p-hydroxybenzoate and copolymers thereof.

19. A laminated film as set forth in claim 17, wherein the polyester is polyethylene terephthalate.

20. A laminated film as set forth in claim 1, 3, 5 or 6, which further comprises a ferromagnetic metal thin film formed on the outer surface of the layer (A).

21. A laminated film as set forth in claim 20, wherein the ferromagnetic metal thin film is a vacuum-deposited ferromagnetic metal thin film.

22. A laminated film as set forth in claim 20, wherein the thickness of the ferromagnetic metal thin film is 500 to 2,000 Å.

23. A laminated film as set forth in claim 20, wherein the ferromagnetic metal is at least one metal selected from the group consisting of Fe, Co, Ni and alloys thereof.

* * * * *